United States Patent [19]

Muir

[11] Patent Number: 4,528,783

[45] Date of Patent: Jul. 16, 1985

[54] METHOD OF SECURING A LINING TO A SUBSTRATE

[75] Inventor: James Muir, Kitchener, Canada

[73] Assignee: Mentor Dynamics Limited, Waterloo, Canada

[21] Appl. No.: 671,070

[22] Filed: Nov. 14, 1984

Related U.S. Application Data

[63] Continuation of Ser. No. 393,414, Jun. 29, 1982, abandoned.

[30] Foreign Application Priority Data

Mar. 3, 1982 [CA] Canada ................................. 397501

[51] Int. Cl.³ .............................................. E04B 1/38
[52] U.S. Cl. ....................................... 52/573; 52/509; 52/746; 220/435
[58] Field of Search ............................. 52/267–269, 52/410, 573, 509, 746–748; 411/338, 371, 373, 455, 471, 907, 512; 220/435, 437, 461

[56] References Cited

U.S. PATENT DOCUMENTS

| | | | |
|---|---|---|---|
| 368,687 | 8/1887 | Rogers | 411/455 |
| 646,601 | 4/1900 | Hasek | 312/140 |
| 1,022,106 | 4/1912 | Murphy | 411/455 |
| 1,930,460 | 11/1931 | Berge | 411/455 |
| 1,988,813 | 1/1935 | Seguin | 411/373 |
| 3,212,861 | 10/1965 | Whitesides | 52/506 |
| 3,238,835 | 3/1966 | Rosenberg | 411/338 |
| 3,374,017 | 3/1968 | Meyer | 52/506 |
| 3,829,150 | 8/1974 | Moore | 411/907 |
| 3,971,075 | 7/1976 | Heinbaugh et al. | 52/471 |
| 3,981,117 | 9/1976 | Dehlen | 52/509 |
| 4,236,438 | 12/1980 | McGauran et al. | 411/371 |

FOREIGN PATENT DOCUMENTS 486348 9/1952 Canada ................................. 52/592
942793 11/1963 United Kingdom ................ 52/410

Primary Examiner—James L. Ridgill, Jr.
Attorney, Agent, or Firm—Stevens, Davis, Miller & Mosher

[57] ABSTRACT

A structure, for example the hold of a ship, having a base surface lined with plastic sheeting having a greater coefficient of expansion than that of the base surface material held to the base surface by a fastening arrangement in which the sheeting is provided with spaced-apart engagable marginal areas bordering aperture means extending from surface to surface of the sheeting. Fastening means includes a metal pin rigidly connected to the base surface and has a shank extending through the sheeting and head means on the pin bearing on the engagable marginal areas. The marginal areas are separated from the shank by an expansion gap to allow movement of the sheeting parallel to the base surface. The shank has a rugose surface, provided with lateral projections intervened by recesses, and the head means is a cap member having a body of resilient material of mushroom-like cross-section provided with a central opening by which it is forcibly impaled on the pin and having a planar base slidably engaging the marginal areas. The aperture means may be openings provided within the peripheral margins of the sheet or the marginal areas of a pair of adjoining sheets making up the sheeting where the aperture means is a gap between the peripheral margins of respective sheets or both. In a preferred structure, the rugose part is made up of a series of frusto conical rings having undersurfaces perpendicular to the axis of the pin providing annular acute cornered ribs and intervening grooves.

11 Claims, 14 Drawing Figures

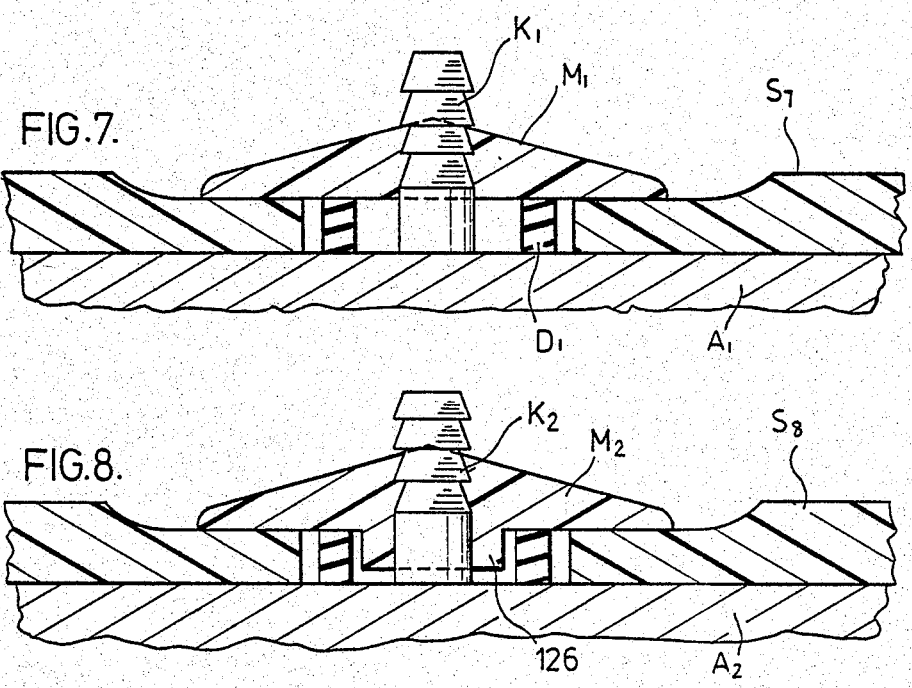
FIG.6.
FIG.7.
FIG.8.
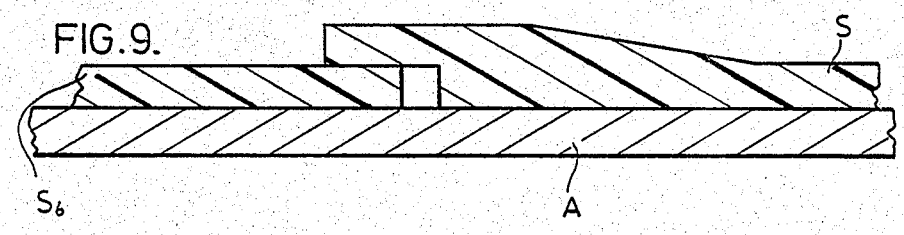
FIG.9.
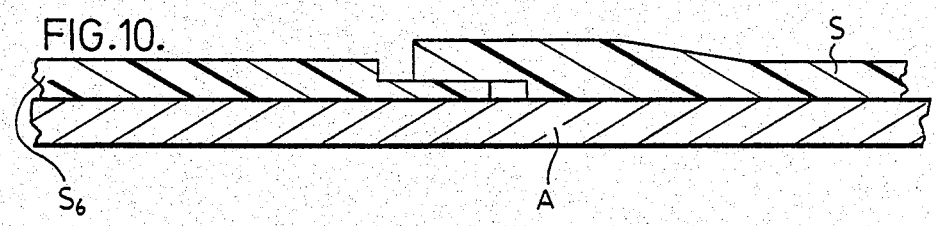
FIG.10.

METHOD OF SECURING A LINING TO A SUBSTRATE

This application is a continuation of application Ser. No. 393,414, filed June 29, 1982, now abandoned.

BACKGROUND OF THE INVENTION

1. Field of the Invention

This invention relates to a method of securing a lining of plastic material to a substrate having a different coefficient of expansion.

2. Description of the Prior Art

The invention is especially useful in securing sheets of ultra-high molecular weight polyethylene (UHMWPE) to a steel surface, for example, in cladding the hold of a ship. Past attempts to fasten UHMWPE sheeting to a steel or concrete surface have employed various expedients, for example, power actuated fasteners or nuts and bolts. These expedients are exemplified in the brochures entitled "Storage Bin and Hopper Lining with Patented Ultra-High-Molecular Low-Pressure Polyethylene and Modern Fastening Systems", a publication by the Hilti Group and Pennekamp +Huesker KG; "Plastics of Inside Lining" (Bulk Material Storage Bins and Hoppers with High-Molecular Low-Pressure Polyethylene Lining), published by Joseph Robb & Company, Limited and Canadian Hilti Limited; and "ULTRA-CLADD Installation and Fabrication Techniques", put out by Scranton Plastic Laminating, Inc.

The problem with fastening UHMWPE linings to a steel surface, for example, is that the difference in coefficient of expansion between the polyethylene and the steel is such that, when the temperature rises, the sheet material buckles between the fastenings, leaving parts of the lining unsupported and subject to damage by the impact of material being handled. Material also gets between the sheet and the base surface and cannot get out. So, when the sheet cools and contracts it pulls itself off the fastener.

Typical UHMWPE shiphold linings are made up of a number of rectangular sheets placed so that, in one direction, the respective sheets have edges spaced-apart by a narrow gap, and, in the other direction, have overlapping margins. Spaced-apart fastening means hold the sheets to the base surface, each fastening means includes a fastening element permanently connected to the base surface and having a shank extending through an opening in the sheet surrounded by an engagable margin, and head means extending from the shank to hold down the surface of the margin. The sheets may range from 3 feet by 6 feet up to 5 feet by 10 feet. The sheet material may have a thickness within the range from ¼ of an inch to 2 inches. The UHMWPE may be one of several types. A preferred type has a molecular weight within the range up to 4½ million and in certain cases the molecular weight may go down as low as 1½ million or even 1 million. In some cases, hybrid materials may be employed, for example, a mix of polyethylene with silicone to form a composition having an increased coefficient of friction or with elastomers to form a composition having increased impact resistance. The properties of UHMWPE sheeting used for lining steel, concrete, or wood surfaces, are well documented in the technical literature. One thing all these materials have in common is that their coefficient of expansion is considerably greater than the structural material whose surfaces they are used to cover, for example, anywhere from 4 to 5 times that of the usual substrate.

SUMMARY OF THE INVENTION

Having regard to the foregoing, it is an aim of the present invention to provide for anchoring sheeting of ultra-high molecular weight polyethylene or other lining material having comparable properties to a steel, concrete, wood, or other surface having a different coefficient of expansion in such a way that the lining is not damaged by expansion and contraction.

A preferred structure, according to the invention, is made up as follows. The lining is arranged as described above. The fastening means includes a metal pin having a shank permanently secured to the base surface and having a girth substantially less than the size of a fastening opening in the lining material to provide a migration zone for the margin of the opening. A separate plastic cap is forcibly impaled on the pin and bears on the margin of the opening. The pin has an integral elongated body of overall circular cross-section, including a rugose part having projections intervened by reentrant depressions. The cap is preferably of substantially mushroom shape and has a body of resilient material provided with a central opening, normally substantially smaller than the girth of the pin, with expanded cap material forming bulges interlocking with the projections and depressions and having an extensive flat undersurface bearing on the surface of the margin thereby to hold it against the base surface while allowing it to slide in directions parallel thereto.

Preferably the pin has an elongated shank of overall circular cross-section whose rugose part is provided with annular ribs intervened by grooves. An effective construction of this general type is one where there is a series of frusto conical rings whose taper is outwards in the direction of the base surface, providing a series of shoulders for engaging the cap. A preferred cap is circular and domed.

Preferably the shielding means for the gaps between adjoining sheets is an elongated extrusion having an integral body including a spine located within the gap, a head of substantially mushroom shaped cross-section providing upper flanges, and lower spaced-apart flanges projecting to each side, presenting a groove receiving adjoining sheet margins in a sliding fit.

Where the base surface being lined is of steel, the pins are of steel and welded to the base surface to extend perpendicular thereto. Where the base surface is on a concrete structure, the metal pin will have an elongated shank, preferably with projections, for embedding in and keying to the concrete. Where the surface is on a wooden structure the pin may have a screw threaded shank which can be screwed into the body of the structure.

Through the arrangement described, the sheets are able to expand in all directions parallel to the base surface, while maintained firmly anchored to it. The combination of the invention is more fully described below as are elements and subcombinations of elements.

BRIEF DESCRIPTION OF THE DRAWINGS

Having thus generally described the invention, it will be referred to more specifically by reference to the accompanying drawings, which illustrate preferred embodiments, and in which:

FIG. 6 is an enlarged side elevation of a cap used in the fastening arrangement of FIG. 5;

FIGS. 7 and 8 are views similar to FIGS. 5 and 6 of alternative fastening units according to the invention;

FIG. 9 is an alternative form of lap joint according to the invention in which the margin of one of the sheets is extruded to provide a special shape;

FIG. 10 is an enlarged cross-section similar to that of FIG. 9, in which the margins of both overlapping sheets are extruded to provide a special shape;

DESCRIPTION OF THE PREFERRED EMBODIMENTS

Figure 1:
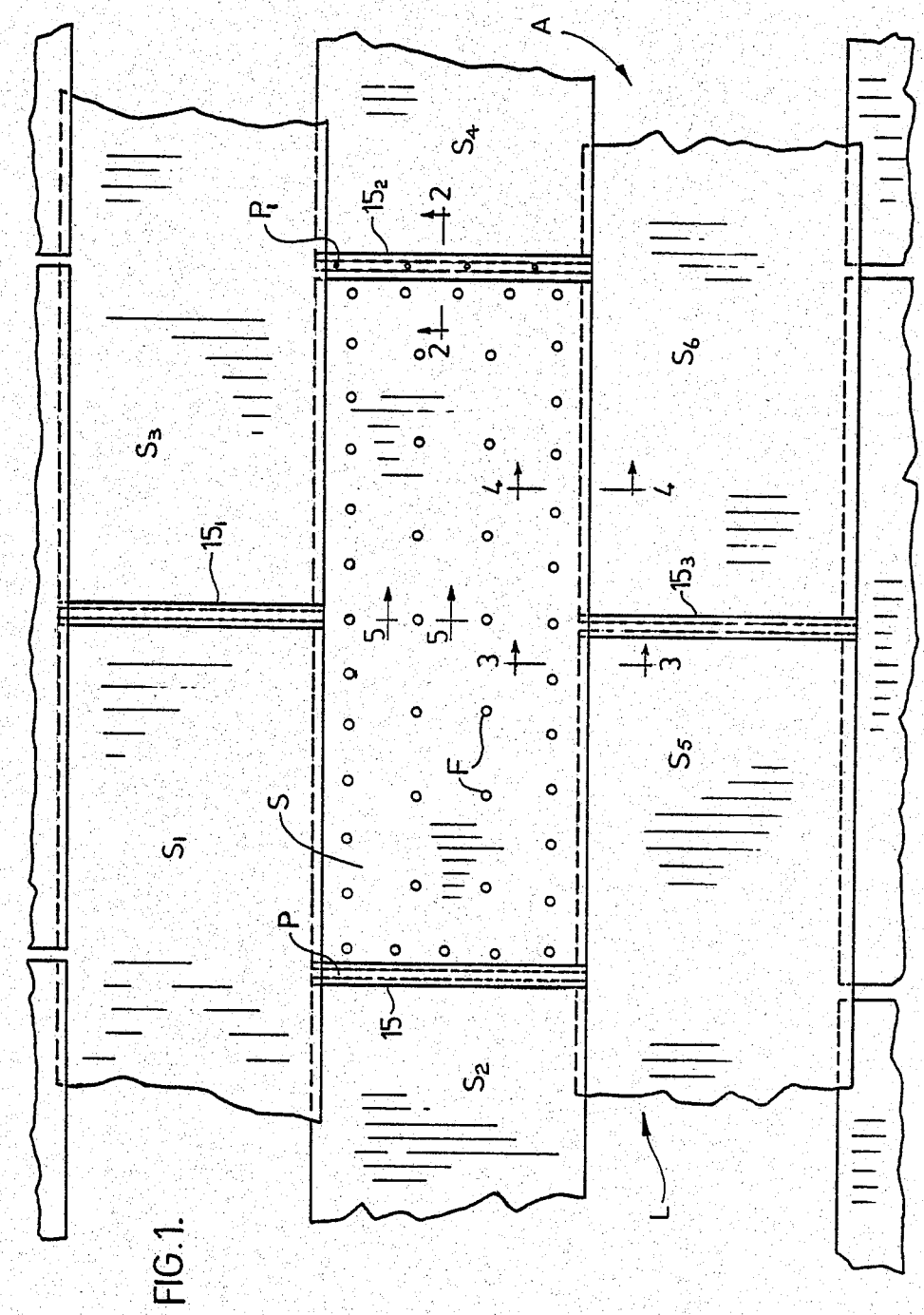
FIG. 1 is a fragmentary face view showing the sloping portion of the steel wall of the hold of a ship having a low friction sheet material lining fastened to it, in accordance with the invention.
Figure 2:
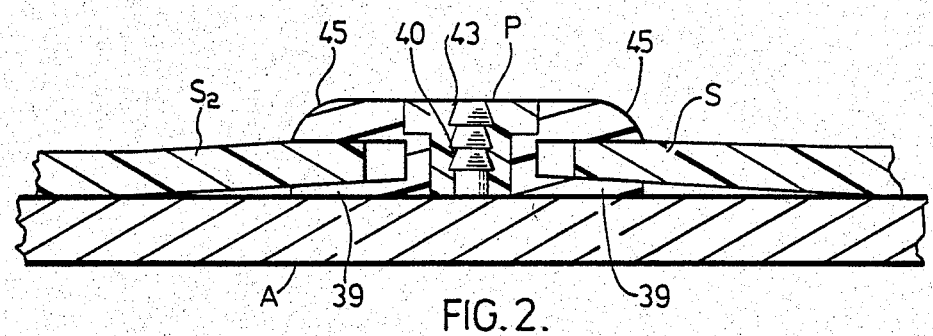
FIG. 2 is an enlarged fragmentary cross-section along the line 2—2 of FIG. 1 showing the structure of a connector extrusion.
Figure 3:
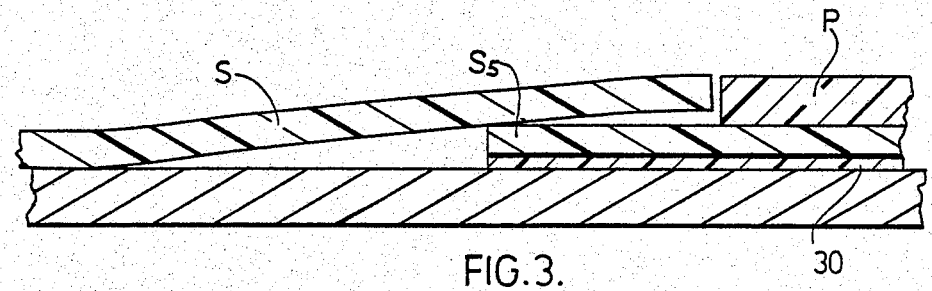
FIG. 3 is an enlarged fragmentary cross-section along the line 3—3 of FIG. 1 showing the overlap of the lining sheets.
Figure 4:
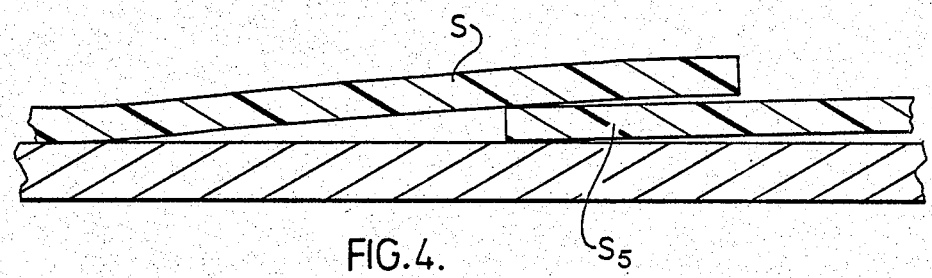
FIG. 4 is an enlarged fragmentary cross-section along the line 4—4 of FIG. 1 showing the overlap of the lining sheets at another position.

Referring more specifically to the drawings, FIG. 1 shows the face of a steel plate shell A of the hold of a ship clad with a low-friction lining L. The linging L is made up of a number of individual sheets S, $S_1$, $S_2$, $S_3$, etc. of ultra-high molecular weight polyethylene (UHMWPE). Adjoining sheets are placed end to end with a small gap intervening them parallel to the direction of cargo flow and adjoining sheets are overlapped slightly in the transverse direction. Plastic connector extrusions P, $P_1$, etc. (details of which are given later) receive the spaced-apart margins 15, $15_1$, $15_2$, etc. of the sheets. Special fastening means F (described later in detail) are arranged in spaced-apart relationship, in arrays, to hold the sheets to the surface of the shell.

Figure 5:
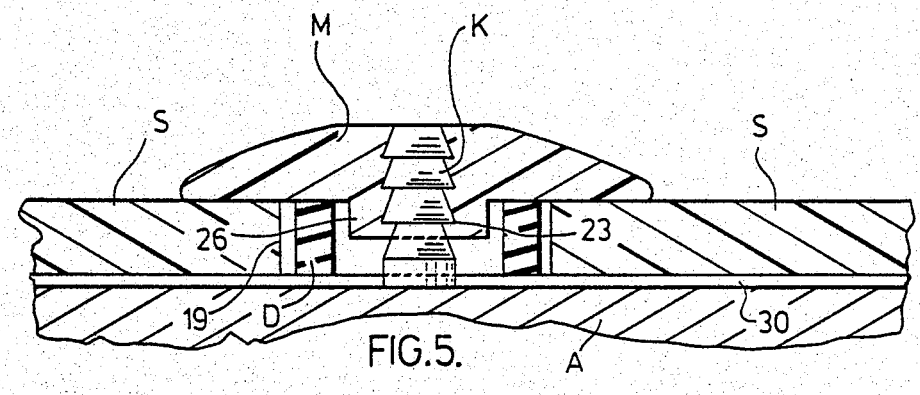
FIG. 5 is an enlarged fragmentary cross-section along the line 5—5 of FIG. 1, that is through a preferred form of fastening unit, according to the invention.

FIG. 5 illustrates a typical fastening. according to the invention, applied in an opening 19 in the sheet S, for example, which is surrounded by an engagable margin of the sheet. The elements of the fastening means are an annular ring pin K of stainless steel, a plastic cap M of UHMWPE impaled on the pin K, and an elastomeric washer D intervening the stud K and the edges of the opening 19.

The pin K, best shown in FIG. 6, has a symmetrical integral body, circular in overall cross-section, and made up of a cylindrical stem 20 of considerably less girth than the size of the opening 19 so that there is a migration zone defined by the margin of the opening 19 and the pin K within which the sheet may move parallel to the surface A. The stem 20 has a rugose part made up of a series of frusto conical rings 21, each presenting a cap-retaining shoulder 23 and a reentrant groove between it and the surface of the next ring. Prior to application, the end of the stem has a bead 20a of surplus metal for welding purposes. The top end of the pin K may be cut off flush with the surface of the polyethylene cap M, after the latter is in place, as shown in FIG. 5.

The cap M, illustrated by itself in FIG. 6, has a circular body of UHMWPE, having a circular planar undersurface 25 meeting a cylindrical neck 26 and domed oversurface 27. The body is provided with a cylindrical central opening or bore 22 of a diameter, when the material of the cap is relaxed, somewhat less than that of the maximum diameter of the frusto conical rings 21 and which may terminate short of the surface 27 to provide a thin frangible wall part 29.

The washer D has a cylindrical body of height slightly greater than the thickness of the sheet S and an outside diameter intermediate that of the stud K and the opening 19.

Preferably, a priming coat 30 of corrosion-resistant material covers the surface of the steel shell A. A fastener F is installed as follows. The priming coat is removed locally and the stem 20 of the stud K welded to the steel shell A. The polyethylene sheet S is placed with an opening 19 concentric to the stud K. The ring D is then placed concentrically with the stud K. The opening in the cap M is brought into register with the end of the stud K and the cap impaled on the stud K by driving it home, for example, with a mallet, until its undersurface 25 seats forcibly on the surface of the polyethylene sheet S and the washer D. The elasticity of the body material of the cap M allows the opening 22 to be expanded by the tapered rings of the stud K to allow the cap to be forced into place, for example, by hammering it on with a mallet. Once in place, the elastic memory of the resilient polyethylene causes it to seeks its normal relaxed state and to expand into the spaces underneath the shoulders 23 in bulges so that the cap material and the projections and depressions on the stud K interlock with the bulges to prevent the cap's withdrawal so that the cap is permanently fixed in place on the stud K to retain the sheet S against the steel shell A. The ring D is squashed slightly between the cap M and the base surface A. In the event of a part of the stud K protruding beyond the crown of the cap M, it may then be ground off so that the cap and stud present a smooth surface over which cargo material can easily slide. Or the length of the stud K may be arranged in conjunction with the thickness of the sheet S so that it does not penetrate the thin wall part 29.

The undersurface 25 of the cap M thus seats forcibly on the outer surface 18 of the sheet S to hold it down. But, the relatively low coefficient of friction between the plastic surfaces of the cap M and that of the sheet S permits lateral movement between them when the sheet S expands or contracts, the sheet S being free to move parallel to the surface of the shell A within the migration zone surrounding the stud K, preventing its buckling.

The edges of the sheets S, $S_1$, etc., parallel to the direction of flow of material, are spaced-apart and the resulting gap shielded with an H-profile extrusion P. Each extrusion P has an integral body, is symmetrical and is provided with a central spine 40, which occupies the gap between the opposed edges of the adjoining sheets S, $S_2$, etc. and a thin flange 39 which protrudes beyond each side of the spine to underline the margins of the adjacent sheets S, $S_2$, etc. The extrusion includes an integral cap part 43 which overlies the spine 40 and has laterally extending flanges 45 overlapping the margins of the adjoining sheets. The cap part 43 has rounded margins so as to reduce interference with the flow of material over it. The spine 40 and respective flanges 39 and 45 thus present between them grooves to receive the margins of the adjoining sheets. The spacing of the flanges 44 and 45 is such that they engage the surface of the adjacent margins firmly preventing relative movement in the direction perpendicular to the base surface A but allow relative lateral and longitudinal movement in all directions because of the low coefficient of friction between the surfaces of the connector P and the surfaces of the lining sheets. The margins of the adjoining sheets are spaced-apart sufficiently to leave a clearance for expansion between their edges and the spine 40 of the connector P.

To hold the extrusion P to the base surface A there are provided a plurality of spaced-apart fastening arrangements. Each fastening arrangement includes an opening 43 in the extrusion and a pin R welded to the base surface A and extending into the opening 43 in a similar manner to the pin K into the opening of the cap M. The pin R is provided with a series of frusto conical rings 50 having a diameter greater than that of the opening 43 as in the case of the cap M. The extrusion P is irreversibly impaled on the pin R and thus firmly held against the base surface A.

The horizontal edges of the lining may be butted against a bulkhead or ballast tank and, where necessary, covered by a steel capping strip. For the edges running in the up and down direction, usually no capping strip is needed.

Alternative versions of fastening units are shown in FIGS. 7 and 8 to which similar reference numerals have been applied as in FIGS. 5 and 6, but raised by 100 and 200 respectively, and the letters have been given an appropriate differentiating subscript. In the version shown in FIGS. 7 and 8, the margin of the sheet $S_7$ surrounding the opening accommodating the fastening unit is depressed, so that the cap M does not protrude so far above the surface of the sheet S.

FIGS. 9 and 10 show alternative forms of lap joint in which the overlapping margins of adjacent sheets S and $S_6$, for example, are formed by extrusion to provide an interlock.

Figure 11:
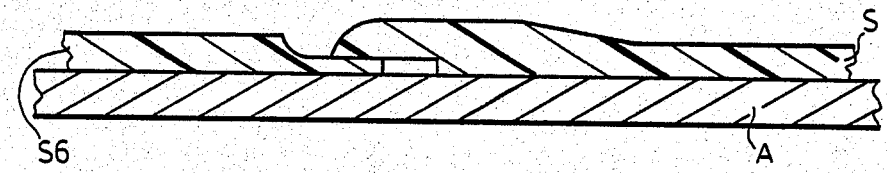
FIG. 11 is an enlarged cross-section similar to that of FIGS. 9 and 10 showing a further form of the invention.

The structures of FIG. 11 have the advantage over that of FIGS. 7 and 8 with the exception that the thickness of the bound sheets at the joint is lower and does not create so much of a bump.

FIG. 11 shows a vertical joint which can be used to shield the gap between respective sheets without a separate extrusion as shown in FIG. 1.

Figure 12:
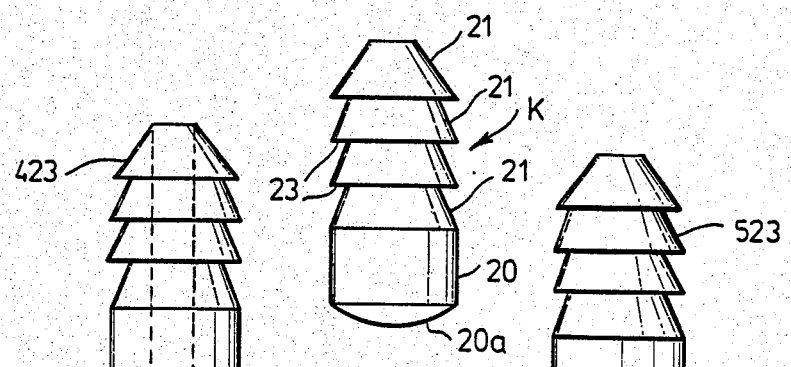
FIG. 12 is an enlarged side elevation of a stainless steel annular ring weld stud for application to a steel surface.
Figure 13:
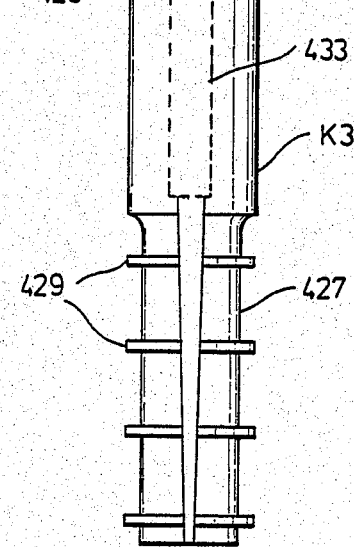
FIG. 13 is a side elevation of a stainless steel annular concrete insert.
Figure 14:
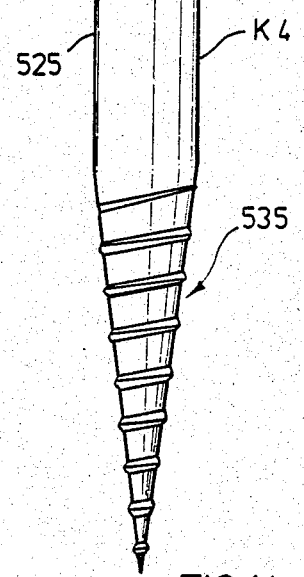
FIG. 14 is a side elevation of a stainless steel wood screw.

FIGS. 12, 13 and 14 illustrate forms of stud K, $K_3$ and $K_4$ for attachment to steel, concrete and wood respectively.

The steel stud K has already been described.

In the concrete stud $K_1$, shown in FIG. 13, the body of the device includes the frusto conical parts 423, a shank 425, which extends into the concrete and a narrowed part 427 provided with keying rings 429 and slot 431 dividing the part 427 into two legs. The body is also provided with a central opening 433 located as shown into which a nail may be driven to spread the legs.

The wood screw $K_2$, shown in FIG. 14, is made up as follows. It includes the part containing the frusto conical sections 523, a reduced section shank 533 and threaded tapering part 535.

Variable Factors

The diameter of the stud K is set by the calculated shear force likely to be encountered. This ranges up to about 300 pounds per fastener. The outside diameter of the pin K may, therefore, run from about ¼ inch to about ½ inch, the preferred diameter being about 5/16ths of an inch. The thicker the lining sheet, the greater the diameter of the pin used.

Preferably, the angle of the face of the leading frusto conical ring 21 to the axis of the pin or stud K is greater than that of the following rings, or to put it another way, the diameter of the leading ring 21 at the top is greater than the diameter of the next ring 21 at its top. This makes for better entry of the opening into the resilient cap M when the latter is hammered onto the pin. The angle of the face of the leading ring may range from about 48° to about 58° to the axis with about 53° preferred and the angle of the faces of the subsequent rings may range from about 12° to about 23° to the axis with about 17° preferred.

A typical spacing of the pins is 12 to 15 inches apart towards the middle of the sheeting and 9 to 12 inches apart near the edges.

The diameter of the cap M may range from about 1¼ inches to about 2¼ inches, with about 1¾ inches preferred. The thickness of the cap at the center ranges from about ⅜ths of an inch to about ½ inch and at the margin tapering to ⅛th of an inch. The diameter of the hole in the cap may run from 0.09 to 0.125 inches less than the outside diameter of the pin. The force required to pull the pin from the cap should be at least about 200 pounds and preferably at least about 300 pounds, although this will normally run higher, say around 360 pounds.

The diameter of the opening 19 in the lining sheet will run from about 0.4 to about 0.6 times the cap diameter with about 0.5 times preferred.

A typical spacing of the fastening members close to the edge of the sheet is 9 to 12 inches and in the body of the sheet the spacing ranges from 12 to 15 inches.

The fastening arrangements in the extrusion are usually about 8 inches apart.

The lining is designed to handle a wide range of cargo material. Examples of cargo are mined lignite or bituminous coal, usually with a high moisture content of say 14 to 15%, ore in natural or pelletized form, limestone, gypsum, soya meal and other grains. A typical ship cargo would be 50,000 tons of lignite in 5 holds, with an unloading rate of 4,000 tons per hour. The low coefficient of friction of the UHMWPE sheeting facilitates sliding of the material over it and protects the base surface.

I claim:

1. In a bulk material handling structure having an extensive substantially even load-bearing base surface of material normally offering frictional resistance to movement against it of bulk material, lined with at least one heavy duty thick plastic sheet of solid tough relatively incompressible polymeric material having a significantly greater coefficient of expansion than that of the base surface material, said sheet having an undersurface juxtaposed against the base surface and free therefrom in an opposite active surface for contact with the bulk material, said active surface being relatively slippery and offering significantly less frictional resistance to the bulk material than the base surface, a fastening arrangement in which said sheet is provided with spaced-apart internal openings extending from surface to surface of the sheet surrounded by an engagable marginal area of the active surface, the fastening arrangement including a rigid metal pin permanently connected to the base surface and having a shank extending through each opening beyond said active surface and a head member on said pin bearing on the engagable marginal area to hold the sheet against the base surface, the relative size of each opening and shank diameter and the placing of the shank within the opening being such that the spaced-apart engagable marginal areas are separated from the shank by a gap to allow localized creeping of the sheet relative to the base surface, the shank having a rugose surface provided with lateral projections intervened by recesses, the head member having a substantially rigid one-piece body of heavy duty resilient plastic material of muchroom-like cross-section provided with a central opening by which it has been forcibly impaled on the shank of the pin, said cap member having an extensive planar base surface slidably bearing against the active surface of the marginal area bordering the opening whereby the sheet is held down against the base surface but left free to creep relative thereto and to the cap member, said cap member presenting a slippery exposed surface merging with the sheet surface and offering minimum resistance to the sliding of bulk material over it, the opening in the cap member having a cross-section normally smaller than that of the shank of the pin whereby its material surrounding the opening is stretched to permit forcibly impaling the cap onto the shank and after impaling bulges of resilient cap material expanded by its elastic memory into the recesses engage the projections to resist withdrawal of the cap member from the pin and to retain its base surface tightly against the active surface of the sheet.

2. A bulk material handling structure having an extensive substantially even load-bearing base surface of material normally offering frictional resistance to movement against it of bulk material, lined with a plurality of heavy-duty thick sheets of solid tough relatively incompressible polymeric material having a significantly greater coefficient each sheet having an undersurface juxtaposed to the base surface, but free therefrom, and an opposite active surface for contact with the bulk material, said active surface being relatively slippery and offering significantly less frictional resistance to the bulk material than the base surface.

each sheet being provided with spaced-apart internal circular openings extending from surface to surface thereof surrounded by an engagable marginal area of the active surface, respective sheets being spaced-apart in one direction by an expansion opening bordered, on each sheet, by an engagable marginal area and, in the other direction, the margin of one sheet overlapping that of the other, fastening means for holding the sheets against the base surface, said fastening means including a rigid metal pin extending through each of said internal openings and a row of spaced-apart metal pins extending through said expansion opening, each pin being permanently connected to said base surface and having a shank extending perpendicularly therefrom through its surrounding opening to beyond said active surface and a head member engaging each pin and bearing on the engagable marginal area to hold the sheet against the base surface, the relative size of each opening and shank diameter and the placing of the shank of each pin within the opening being such that the spaced-apart engagable marginal areas are separated from the shank by a gap to allow localized creeping of the sheet relative to the base surface, each shank having a rugose working surface provided with lateral projections intervened by recesses and the head member being a one-piece cap member substantially rigid having a body of solid heavy duty polymeric plastic material of mushroom-like cross-section, a separate circular cap member having a central opening to receive the pin in each internal opening and the longitudinal cap member having spaced-apart openings each for receiving one of said pins in the row, the cap members having been forcibly impaled on the shanks of the pins and each having an extensive planar base surface slidably bearing against the active surface of the marginal areas bordering the openings and bridging the gap between them and the shank of the pin, whereby the sheet is held down against the base surface and free to creep relative thereto and to the cap member, said cap members each presenting a slippery exposed surface forming a continuation of the active sheet surface and offering minimum resistance to the sliding of bulk material thereover, the opening in the cap member having a cross-section normally smaller than that of the shank of the pin whereby its material surrounding the opening is stretched, forcibly impaling the cap onto the shank and after impaling bulges of resilient cap material expanded by its elastic memory into the recesses engage the projections to resist withdrawal of the cap member from the pin and to retain its base surface tightly against the active surface of the sheet.

3. A structure, as defined in claim 2, in which each marginal area surrounding the circular openings and engaged by the cap member is countersunk.

4. A structure, as defined in claim 2, in which the overlapping margin of one sheet is thinned to provide a tongue overlying said base surface and the margin of the other sheet has a corresponding recess, providing with the base surface, a groove to receive said tongue with a clearance between the margin of the tongue and the base of the groove to allow for expansion of the sheet.

5. A structure, as defined in claim 2, in which the pin has a rugose part made up of a series of frusto conical rings having undersurfaces perpendicular to the axis of the pin providing annular ribs and intervening grooves, each ring being provided with a relatively sharp corner between its frusto conical surface and undersurface embedding itself in the resilient material of the cap with the latter expanding beneath said corner in said bulges which resist removal of the cap from the pin.

6. A structure, as defined in claim 5, in which the rings increase in diameter in the direction of the stem.

7. A structure, as defined in claim 2 or 1, wherein there is a resilient ring between and spaced from the edges of said margins and said shank and extending between the cap member and the base surface to provide a protective chamber about said shank.

8. A structure, as defined in claim 2 or 1, in which,
the lining is of ultra-high molecular weight polyethylene having a thickness from about ¼ inch to about 2 inches,
the pin is of steel and has a stem diameter from about ¼ inch to about ½ inch,
each cap member for the internal fastening means is of ultra-high molecular weight polyethylene and has a maximum thickness of from ⅜ of an inch to about ½ inch and a diameter from about ¼ inch to about 2¼ inches and the central opening has a diameter from about 0.09 to about 0.125 inches less than the outside diameter of the pin whereby a force of at least 200 pounds is required to pull the cap from the pin.

9. A bulk material handling structure as defined in claim 2 or 1, in which the polymeric material is ultra-high molecular weight polyethylene.

10. A method of lining an extensive substantially even load-bearing base surface of a bulk material handling structure, where said surface is made of material normally offering frictional resistance to movement against it of bulk material, and the lining is of heavy duty thick rectangular plastic sheets of solid tough incompressible polymeric material having a significantly greater coefficient of expansion than that of the base surface material, and in which each sheet has an undersurface juxtaposed to the base surface but is free therefrom and an opposite active surface for contact with the bulk material and the active surface being relatively slippery and offering significantly less frictional resistance to the bulk material than the base surface, comprising the steps of,
selecting sheets having spaced-apart internal apertures extending from surface to surface thereof and each aperture having a surrounding engagable margin,
selecting a plurality of metal pins of diameter considerably smaller than the apertures and of length greater than the thickness of the sheet having a rugose shank portion,
fixing a plurality of the pins permanently to the base surface in a position to locate each pin within an aperture of a sheet and a row of spaced-apart pins within a spacing between adjacent sheets and placing the sheets to cover the base surface with said internal openings receiving a pin and wherein the sheets are spaced apart by an expansion opening in one direction and overlapping in the other direction whereby the row of pins lies in the expansion opening between the respective sheets,
forcibly impaling on each pin a cap member having a circular shaped body of resilient plastic material and a central opening to receive a pin and on the row of pins an elongated cap member having a domed body and a plurality of spaced-apart openings to receive the pin, each opening being of diameter less than the effective diameter of the pin whereby the cap member is impaled on the pin and forcibly urged to bear on the engagable margin to be retained in that position on the expansion of the resilient plastic material into interlocking engagement with the rugose surface of the pin thereby to hold the sheet against the base surface.

11. A method as defined in claim 10, in which the polymeric material is ultra-high molecular weight polyethylene.

* * * * *